: (12) United States Patent
Afonso et al.

(10) Patent No.: US 7,770,566 B2
(45) Date of Patent: Aug. 10, 2010

(54) METHOD FOR CONTROLLING AN INTERNAL COMBUSTION ENGINE

(75) Inventors: Vasco Afonso, Cerny (FR); Serge Bazoge, Brieres les Scelles (FR); Alexandre Silveira, Sao Jose Dos Pinhais (BR); Jean-Claude Vallet, Egly (FR); Aymeric Walrave, Mennecy (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 12/092,465

(22) PCT Filed: Oct. 27, 2006

(86) PCT No.: PCT/FR2006/051122

§ 371 (c)(1),
(2), (4) Date: Oct. 6, 2008

(87) PCT Pub. No.: WO2007/051943

PCT Pub. Date: May 10, 2007

(65) Prior Publication Data

US 2009/0217917 A1 Sep. 3, 2009

(30) Foreign Application Priority Data

Nov. 3, 2005 (FR) .................................. 05 53328

(51) Int. Cl.
*F02D 41/30* (2006.01)
(52) U.S. Cl. ...................................... 123/672; 123/685

(58) Field of Classification Search .................. 701/105, 701/109; 123/431, 443, 672, 685, 453, 491, 123/198 A; 60/285

See application file for complete search history.

(56) References Cited

U.S. PATENT DOCUMENTS

| 5,220,788 | A | * | 6/1993 | Kurita et al. .................. 60/274 |
| 5,255,661 | A | | 10/1993 | Nankee, II et al. |
| 5,400,762 | A | | 3/1995 | Fodale et al. |
| 5,881,703 | A | | 3/1999 | Nankee, II et al. |
| 5,950,599 | A | | 9/1999 | Rotramel et al. |
| 6,349,540 | B1 | * | 2/2002 | Nakayama et al. ............. 60/277 |
| 6,434,929 | B1 | * | 8/2002 | Nishimura et al. ............. 60/278 |
| 7,475,683 | B2 | * | 1/2009 | Kokubu ...................... 123/672 |
| 7,526,374 | B2 | * | 4/2009 | Carr et al. .................... 701/104 |
| 2004/0182378 | A1 | | 9/2004 | Oshimi et al. |
| 2009/0082947 | A1 | * | 3/2009 | Tashima ..................... 701/109 |

FOREIGN PATENT DOCUMENTS

| EP | 1375885 | * | 1/2004 |
| FR | 2 840 028 | | 11/2003 |
| JP | 5 125977 | | 5/1993 |

* cited by examiner

*Primary Examiner*—Hai H Huynh
(74) *Attorney, Agent, or Firm*—Oblon, Spivak, McClelland, Maier & Neustadt, L.L.P.

(57) ABSTRACT

A method for controlling an internal combustion engine that is to be operated either by petrol or alcohol or by a variable proportion of the two fuels and that includes an electronic control unit that can drive the engine, an admission line, and an exhaust line that includes a richness probe. The method determines the richness of the carbide mixture entering into the combustion cylinders, and increases the duration of the injection by intervals according to the richness of the carbide mixture.

10 Claims, 2 Drawing Sheets

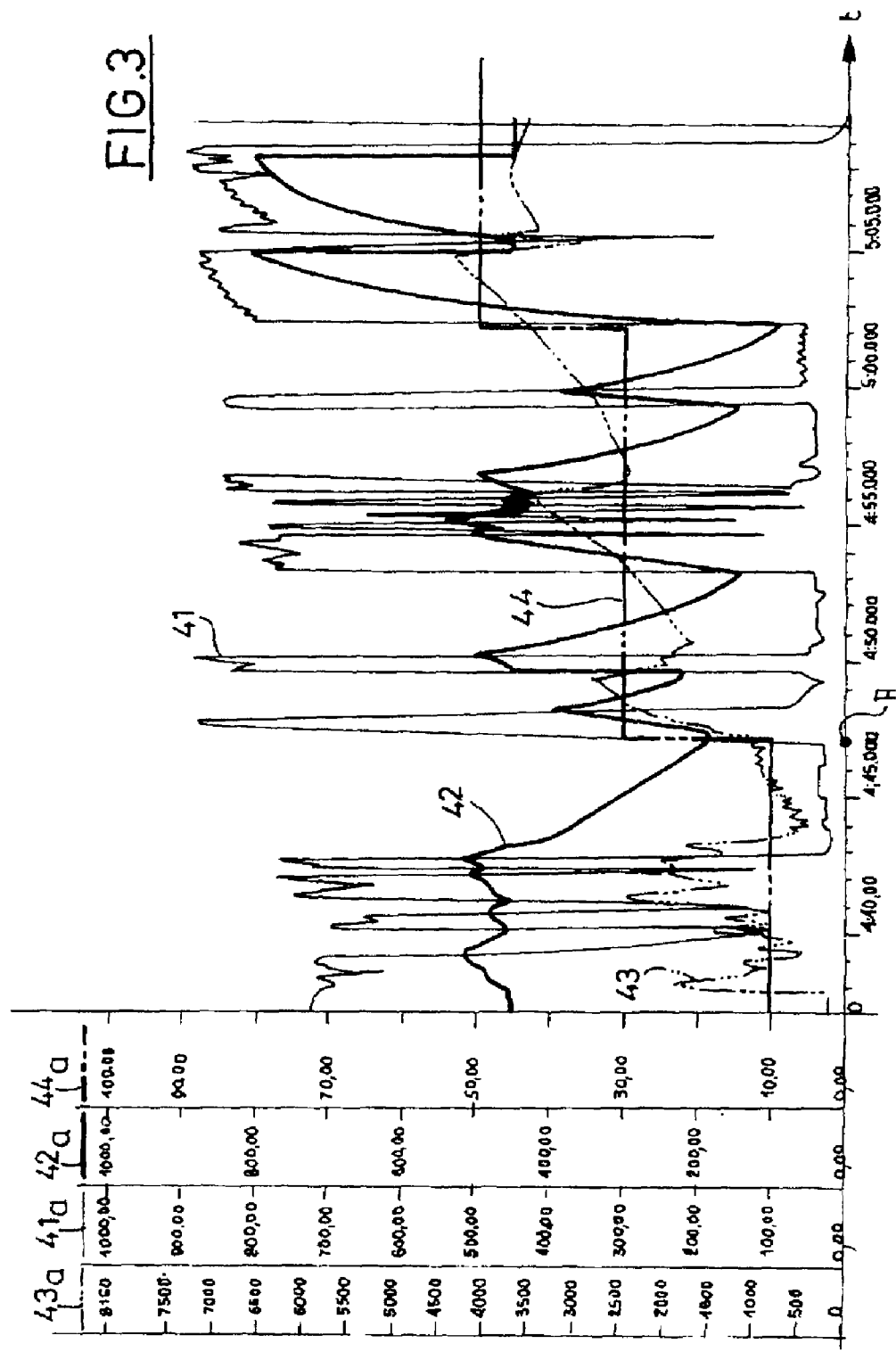

METHOD FOR CONTROLLING AN INTERNAL COMBUSTION ENGINE

BACKGROUND OF THE INVENTION

I. Field of the Invention

The present invention relates to the control of the operation of an internal combustion engine. It relates more particularly to the control of internal combustion engines intended to operate with various types of fuel.

II. Description of Related Art

Such operating control systems consist in managing the internal combustion engine by means of various sensors and actuating devices associated with a set of control parameters or software programs, stored in a processor mounted on the motor vehicle, called an "electronic control unit" (ECU). The ECU receives signals coming from all the sensors with which the vehicle is fitted, so as to enable the processor to identify the state of the engine in real time. From the physical values received by the processor contained in the ECU, it is able to control or regulate all the actuating devices of the engine for optimum operation.

To control a dual-fuel engine capable of operating with gasoline alone, with alcohol alone, or with a mixture of the two, one of the important signals which the ECU must take into account is the proportion of each of the two fuels contained in the main tank of the engine. In fact, the control parameters of the engine such as the ignition advance and the injection time must be adjusted according to this signal. It is therefore extremely important to know as accurately and as rapidly as possible which fuel or which mixture of fuels is present in the tank of the vehicle in order to adjust these various control parameters of the engine, to avoid damaging it and to minimize the emissions of pollutants.

BRIEF SUMMARY OF THE INVENTION

The invention proposes to use advantageously the signal coming from a richness sensor, also called an "all or nothing lambda sensor," in order to determine the composition of the fuel contained in the tank and adjust certain control parameters of this engine according to this composition.

The lambda sensor is a sensor fitted in the exhaust pipe of which the output voltage can switch between a high level (rich mixture) and a low level (lean mixture) situated on either side of a threshold which is the stoichiometric ratio ("lambda 1"), according to the composition of the exhaust gases. For example it is currently considered that the lambda-type sensor measures a lean air/fuel mixture (that is to say a richness less than lambda 1) when it supplies a voltage less than 450 mV and vice versa.

The output signal of the lambda sensor is converted by the ECU and the logic signal which results from this is a square wave to which, conventionally, the logic value "1" is assigned when it is at the high level and the value "−1" when it is at the low level.

Known from the publication U.S. Pat. No. 5,255,661 is a method for determining the percentage of alcohol contained in the tank of an engine using an oxygen sensor. However this method works with a physical device for limiting the percentage of variation in the composition of the fuel. Thus, the fuel pump and another fuel tank of limited size are added and installed inside the main tank.

The present invention aims to overcome the aforementioned disadvantage by providing a method for obtaining information about the composition of the mixture of fuels contained in the tank which does not require the installation of an additional device.

Another objective of the present invention is to determine as rapidly as possible the proportion of alcohol present in the main tank of the engine and then adjust the control parameters of said engine for this proportion.

With this aim in mind, the invention provides a method for controlling an internal combustion engine characterized in that it comprises at least one step consisting in determining the richness of the hydrocarbon and air mixture entering the combustion cylinders and one step consisting, according to the richness of the hydrocarbon and air mixture, in increasing the injection period in stages, this coefficient of increase of the injection period being specifically representative of the percentage of alcohol present in the tank.

Advantageously, the step consisting in determining the richness of the hydrocarbon and air mixture comprises a step consisting in determining whether the engine operating phase requires the hydrocarbon and air mixture to be rich, a step consisting in filtering the output signal of the richness sensor, a step of comparing this filtered signal with a preset threshold and a timed stabilization period step.

Advantageously, the step consisting in increasing the injection period in stages is carried out if at the end of the timed stabilization period the value of the filtered signal is below the preset threshold.

According to an embodiment of the invention, the level of increase of the injection period is proportional to the preceding injection period.

Moreover, the level of increase of the injection period is 20% of the injection period of the preceding engine cycle.

Preferably, the timed stabilization period is reset after each increase of the injection period.

Advantageously, after the detection of an engine stall occurring during a timed period and if the hydrocarbon and air mixture contained in the combustion chambers of the engine is lean, the injection period of the next engine cycle is positioned at a value which is generally a median value between the injection time required to obtain a stoichiometric hydrocarbon and air mixture when the tank of the engine contains only gasoline and the injection time required to obtain a stoichiometric hydrocarbon and air mixture when the tank contains only alcohol.

In addition, the median value of the injection period is generally the injection time required to obtain a stoichiometric hydrocarbon and air mixture when the tank of the engine contains only gasoline, increased by 33%.

The general principle of the invention is as follows: the raw output signal of the richness sensor is initially filtered by a low-pass filter. The filtered signal is constantly monitored. If this filtered signal falls below a preset value although the operating conditions of the engine require that the hydrocarbon and air mixture be rich, the system interprets this crossing of the threshold as an incorrect analysis of the fuel present in the tank. The corrective step consists in extending the next injection period in order to increase the richness of the mixture present in the combustion chamber.

BRIEF DESCRIPTION OF THE DRAWINGS

Other advantages and features of the present invention will emerge from the examination of the detailed description of a non-limiting embodiment, and from the attached drawings, in which:

FIG. 3 is a time graph of various signals processed according to the inventive method.

DETAILED DESCRIPTION OF THE INVENTION

Figure 1:
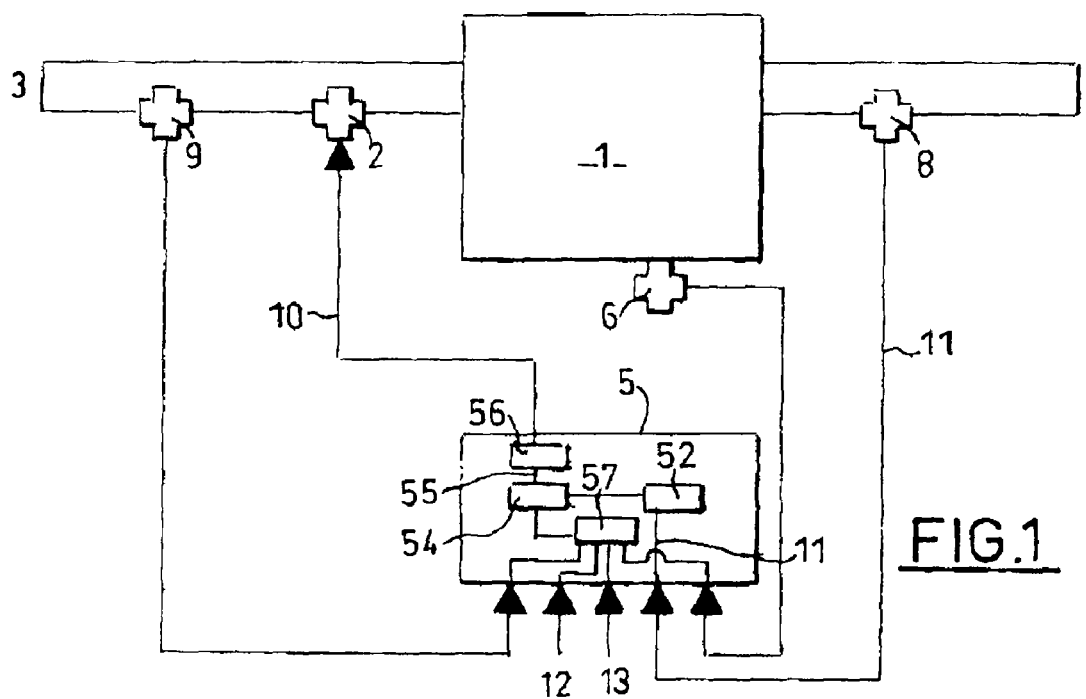
FIG. 1 is a partial schematic view of an internal combustion engine fitted with a richness sensor.

Reference is made to FIG. 1. The reference number 1 designates a controlled-ignition internal combustion engine.

The engine 1 is fitted with an injector 2 fitted in the intake manifold 3. The injector 3 receives a control signal from a programmed microprocessor 5.

The microprocessor 5 receives moreover via a connection 11 a signal supplied by a sensor 8 arranged in the exhaust pipe 4 of the engine 1. This signal contains information about the residual oxygen content of the exhaust gases and consequently about the current ratio of air to fuel in the mixture drawn in by the engine 1. The high and low levels of this signal correspond to richnesses which are respectively above and below the stoichiometric ratio (lambda 1).

The microprocessor 5 receives as input the voltage coming from the sensor 8. This signal is then transmitted via the connection 11 to a filtering unit 52. At the same time, the microprocessor 5 receives as input various operating parameters of the engine 1, including in particular, the pressure 9 of the air drawn in by the engine 1, the speed of rotation 6 of the engine, the temperature 12 of the air entering the engine or even the temperature 13 of the engine coolant. These signals enable the processor to determine whether the engine is in an operating mode for which it must be fed with a rich hydrocarbon and air mixture. If this condition is met and if the associated timed stabilization period has expired, then the unit 57 authorizes the unit 54 to see the sensor voltage filtered by the unit 52. The unit 54 then compares the value of this signal with a preset value. The result of this comparison is transmitted to the unit 56 via the connection 55. This unit will control the open period of the injector 2 according to the signal coming from the unit 54 via the connection 10.

The programming of the percentage of alcohol contained in the main tank of the engine and the correction of the injection period are carried out on the basis of the analysis of the behavior of the raw signal generated by the sensor 8. If after filtering this signal exhibits a leanness characteristic, in other words it falls below a preset threshold, advantageously 350 mV, although the engine 1 has been required to be rich (starting or full load) or stoichiometric, the fuel injection period is increased compared with the preceding injection period.

Figure 2:
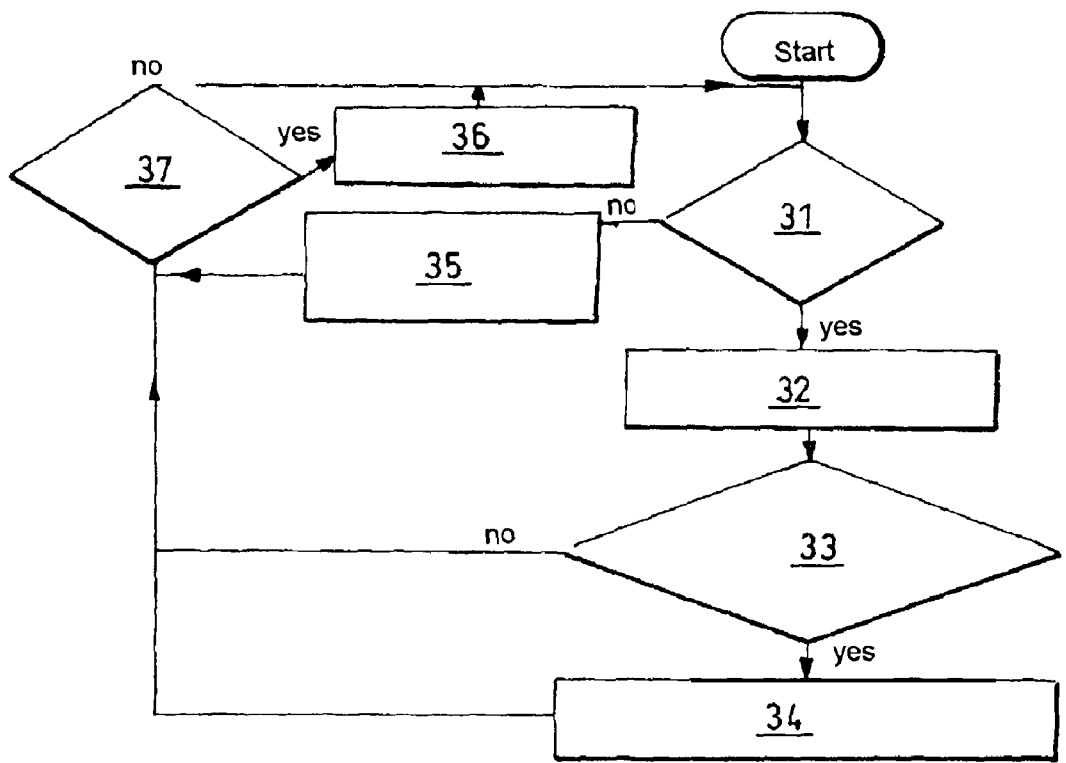
FIG. 2 is a flowchart of the sequence of operations of the method according to the invention.

The various steps of this program will be better understood by referring to the flowchart illustrated in FIG. 2.

For the start of the program, at step 31, a check is made to find out whether the engine is in a situation where it needs to have a richness higher than 1, which may be a starting or full load situation.

If these conditions for programming the type of fuel contained in the tank are met, the step 32 operations are carried out. The voltage of the sensor 8 is filtered and a timed stabilization period is started. This timed period ensures that the system is stable, therefore that the programming conditions are met for a long enough period, and thus avoiding an unwanted correction of the injection period. The output signal of the sensor 8 is filtered according to the engine airflow rate to take into account the velocity of the exhaust gases at the sensor. This means that the parameters of the filter, and in particular its time constant, are adjusted according to the airflow entering the combustion cylinders.

If, after the timed stabilization period the signal is below a calibrated threshold (advantageously 350 mV), which is the step 33 check, it is considered that the hydrocarbon and air mixture entering the combustion chambers has remained lean for too long and that there has been an error in the analysis of the fuel present in the tank (contained in the calibration of the filter). Step 34 of the program consists in increasing by a preset value, advantageously 20%, the preceding injection period in order to increase the richness of the hydrocarbon and air mixture. The timed stabilization period is also reset at this step.

If the programming conditions are not met, the step 35 instructions are carried out. The filtered value of the output signal of the sensor and the timed stabilization period are reset.

The step 37 check is then carried out. If an engine stall is detected and at the same time the signal coming from the sensor 8 indicates that the hydrocarbon and air mixture is lean although the engine has only recently started, the step 36 instructions are carried out. The injection time will be adjusted. This injection time will generally be the average between the injection time producing a stoichiometric hydrocarbon and air mixture when the fuel is gasoline and the injection time producing a stoichiometric hydrocarbon and air mixture when the fuel is alcohol. Advantageously this median injection time is the injection time required to obtain lambda 1 with gasoline, increased by 33%. This step prevents additional stalls and ensures that the next start will take place under correct conditions.

If the step 33 conditions are not met, step 37 and if necessary step 36 is (are) carried out.

After step 34, step 37 and if necessary step 36 is (are) carried out.

With this reactive program, it is possible (and it is permissible in special cases) to have no more than one unwanted increment of the injection time. To overcome this problem, only a fraction, advantageously 60%, of the post-correction injection period is stored by the processor before it is electrically disconnected. This fractional storage prevents an unwanted over-richness the next time the engine is started.

Reference is now made to the time graphs in FIG. 3. The signal marked 41 on this figure is the output signal of the richness sensor and the signal 42 is the result of the filtering of the signal 41. The scales 41a and 42a graduated in millivolts enable respectively the values taken by these signals to be read. The signal 43 gives the relevant engine speed, its y-coordinate being read on the graduation 43a in revolutions per minute. The signal 44 represents the percentage of increase of the period of the injections in other words the programming intervals.

It is clearly seen on this figure that when the filtered signal 42 reaches a pre-calibrated threshold, the percentage of increase of the period of the injections changes at point A from 10 to 30%. This means that the next injection will be 20% longer than the one immediately preceding it.

By means of this program the period of the injections is continually adjusted to the mixture of fuels contained in the tank of the dual-fuel engine.

The invention claimed is:

1. A method for controlling an internal combustion engine intended to operate either with gasoline or with alcohol or with a variable proportion of the gasoline or alcohol, including an electronic control unit capable of controlling the engine, an intake manifold, and an exhaust pipe including a richness sensor, the method comprising:

injecting a fuel mixture present in a tank of the engine at a predetermined injection period;

determining richness of a hydrocarbon and air mixture entering combustion cylinders;

increasing, according to the richness of the hydrocarbon and air mixture, the injection period in stages to adjust the injection period of the fuel mixture present in the tank of the engine and to obtain a generally stoichiometric hydrocarbon and air mixture; and storing a fraction of the adjusted injection period that obtains the generally stoichiometric hydrocarbon and air mixture as the predetermined injection period to be used during the injecting a next time the engine is started.

2. The method for controlling an internal combustion engine as claimed in claim 1, wherein the determining the richness of the hydrocarbon and air mixture comprises:

determining whether an engine operating phase requires the hydrocarbon and air mixture to be rich;

filtering an output signal of the richness sensor;

comparing the filtered signal with a preset threshold; and stabilizing a timed period.

3. The method for controlling an internal combustion engine as claimed in claim 2, wherein the increasing the injection period in stages is carried out if at an end of a timed stabilization period the value of the filtered signal is below the preset threshold.

4. The method for controlling an internal combustion engine as claimed in claim 3, wherein a level of increase of the injection period is proportional to a preceding injection period.

5. The method for controlling an internal combustion engine as claimed in claim 4, wherein the timed stabilization period is reset after each increase of the injection period.

6. The method for controlling an internal combustion engine as claimed in claim 3, wherein a level of increase of the injection period is 20% of a nominal injection period when the fuel is gasoline.

7. The method for controlling an internal combustion engine as claimed in claim 1, further comprising:

detecting an engine stall and when the hydrocarbon and air mixture contained in the combustion chambers of the engine is lean, setting the injection period of the next engine cycle is to a median value between an injection time required to obtain a stoichiometric hydrocarbon and air mixture when the tank of the engine contains only gasoline and an injection time required to obtain a stoichiometric hydrocarbon and air mixture when the tank contains only alcohol.

8. The method for controlling an internal combustion engine as claimed in claim 7, wherein a value of the injection period is an injection time required to obtain a stoichiometric hydrocarbon and air mixture when the tank of the engine contains only gasoline, increased by 33%.

9. The method for controlling an internal combustion engine as claimed in claim 1, wherein fraction of the adjusted injection period preceding electrical disconnection of the electronic control unit that is stored is 60%.

10. The method for controlling an internal combustion engine as claimed in claim 1, wherein the filtering the output signal of the richness sensor includes adjusting an unfiltered signal of the richness sensor according to an airflow rate of the engine.

* * * * *